United States Patent
Bradley et al.

(10) Patent No.: US 6,331,352 B1
(45) Date of Patent: Dec. 18, 2001

(54) CORRECTION TAPE HAVING DYE MIGRATION BLOCKING PROPERTIES

(75) Inventors: Creg G. Bradley, Simpsonville; Teresa B. Hopper, Belton; Peter D. Gabriele, Simpsonville, all of SC (US)

(73) Assignee: Bic Corporation, Milford, CT (US)

( * ) Notice: Subject to any disclaimer, the term of this patent is extended or adjusted under 35 U.S.C. 154(b) by 0 days.

(21) Appl. No.: 09/373,908

(22) Filed: Aug. 13, 1999

(51) Int. Cl.$^7$ .................................. C09J 7/02; B32B 7/12
(52) U.S. Cl. .................. 428/354; 428/343; 428/355 AC; 428/906
(58) Field of Search ..................... 428/354, 343, 428/355 AC, 906

(56) References Cited

U.S. PATENT DOCUMENTS

| | | | |
|---|---|---|---|
| 5,221,577 | * 6/1993 | Inaba et al. | 428/354 |
| 5,700,552 | * 12/1997 | Katsuro et al. | 428/214 |
| 5,997,994 | * 12/1999 | Matsushima | 428/195 |

FOREIGN PATENT DOCUMENTS

| | | |
|---|---|---|
| 647689 | 12/1995 | (EP) . |
| 647689 A1 | 12/1995 | (EP) . |
| 727378 A1 | 8/1996 | (EP) . |
| 8258494 | 10/1996 | (JP) . |
| WO 92/07039 | 4/1992 | (WO) . |
| WO 94/29393 | 12/1994 | (WO) . |
| WO 96/01878 | 1/1996 | (WO) . |
| WO 98/30641 | 7/1998 | (WO) . |

* cited by examiner

Primary Examiner—Daniel Zirker
(74) Attorney, Agent, or Firm—Pennie & Edmonds LLP

(57) ABSTRACT

The present invention is directed to correction tapes having dye migration blocking properties. More specifically, the present invention includes a correction tape having a dye migration barrier. The dye migration barrier comprises an organic material that serves as a physical barrier to prevent dye from migrating from the lower corrected layer to the visible surface. Additionally, the present invention is directed to a process for the manufacture of a correction tape having a dye migration barrier.

16 Claims, 1 Drawing Sheet

CORRECTION TAPE HAVING DYE MIGRATION BLOCKING PROPERTIES

BACKGROUND OF THE INVENTION

The present invention is directed to correction tapes having dye migration blocking properties. More specifically, the present invention includes a correction tape having a dye migration barrier. The dye migration barrier comprises an organic material that serves as a physical barrier to prevent ink dye from markings covered by the correction tape from migrating to an upper visible surface of the correction tape. Additionally, the present invention is directed to a process for the manufacture of a correction tape having a dye migration barrier.

Correction tape is a commonly used method to cover markings. The tape typically comprises two parts, a polymeric support member as a base and a correction medium releasably attached to the base. A correction medium may be multi-layered, and may contain pigments, fillers, such as clay, a polymeric binder and dispersant to anchor the pigments to the paper, as well as, a dispersant medium or solvent to maintain fluid viscosity. The correction medium is later transferred onto paper to cover markings once pressure is applied on the tape.

Conventional correction tapes typically allow ink dyes from the covered markings to bleed through the applied correction medium. The dissolution of the underlying ink dyes from the reaction of the ink dye with the correction medium causes the so-called bleeding or smudging of the markings into the correction medium, which discolors the correction medium on the corrected marking. Bleeding causes the typically white correction medium to assume a bluish or reddish tint or other type of blemish color due to the ink dye migrating toward the upper visible surface of the layer of correction medium. This bleeding effect is a known shortcoming of conventional correction tapes.

Correction fluids have been developed to solve the problem of bleed-through. See, European Publication No. 0 647 689 A1, PCT Publication No. WO 92/07039, PCT Publication No. WO 94/29393, PCT Publication No. WO 96/01878, and PCT Publication No. WO 98/30641.

Japanese Patent No. 2,692,642 discloses a correction tape comprising a correction material, a metal thin film layer, and an adhesive layer. The metal thin film layer provides a masking effect. The correction medium layer has the same color tone as that of a plain paper effected by incorporating a white pigment into a resin material or by providing a white printing layer on the surface of the base material layer. The correction tape manufactured with a metal thin film layer is costly because the metal thin film layer is applied using specialized vapor deposition techniques instead of standard layering techniques. Additionally, the vapor deposition of a metal requires harsh manufacturing conditions that strain the correction medium layer such as high temperatures, low pressures, and drying periods under vacuum.

Some of the commercially available correction tape products are made using polymers dissolved in organic solvents which provide some protection against bleeding, however, environmental regulations restrict the use of organic solvents on an industrial scale due to pollution problems. Measures taken to decrease the environmental impact of the use of organic solvents increase production costs of correction tapes. Other commercial products do not have adequate bleed inhibiting characteristics.

Despite these efforts correction tapes having better bleed through resistance are still desired by the industry. As new water and solvent based ink compositions are developed, new compositions and formulations of correction tapes are necessary to maintain good bleed through resistance.

SUMMARY OF THE INVENTION

An object of the present invention is to provide a correction tape that inhibits bleed-through through the correction medium when applied to printed or ink dye markings.

Another object of the present invention is to provide a manufacturing process for a correction tape with a dye migration barrier.

Another object of the present invention is that film integrity of the correction tape is improved thus avoiding premature breakage, as found in current correction tapes.

Yet another object of the present invention is to provide a manufacturing process that does employ environmentally friendly chemicals and chemical processes.

The present invention is directed to a correction tape comprising at least one support member, at least one correction medium, at least one dye migration barrier, and at least one pressure sensitive adhesive layer. The support member retains a correction medium, dye migration barrier and an adhesive layer. Typically the support member is paper, thermoplastic film, a metallic foil, or a coated glassine paper to facilitate removal of the correction medium. Optionally, the support member can be coated with a releasing agent, such as a polyolefin, polysiloxane, polyfluoroolefin, or a mixture thereof. The dye migration barrier is present in an amount sufficient to prevent ink from migrating through at least the dye migration barrier and retain correction medium integrity when the correction medium is transferred to a surface. The dye migration barrier is typically an organic polymer or copolymer made of acrylate, methacrylate, styrene, styrene acrylic, styrene butadiene, vinyl acetate homopolymer, a low volatile organic compound, vinyl acetate, vinyl acetate ethylene, cellulose, or copolymers thereof. Preferably, the organic polymer comprises at least one ethylene, vinyl acetate, ethylene vinyl acetate, or copolymers thereof. The dye migration layer thickness may be between about 1 micron to about 100 microns in thickness, preferably, between about 3 microns to about 45 microns.

The pressure sensitive adhesive typically includes at east one organic polymer made from monomers of acrylic, ethacrylic, or a mixture thereof.

Another aspect of the present invention includes a process for the manufacture of a correction tape having the steps of providing a support member; applying a correction material in a sufficient amount onto the support member to form a first layer, a correction medium, preferably with a thickness of between about 40 to about 60 microns when wet; allowing the first layer to dry to form a correction medium; applying an organic polymer to the first layer in a sufficient amount to form a second layer, preferably with a thickness of between about 3 micron to about 5 microns; allowing the second layer to dry to form a dye migration barrier; applying an adhesive material to the second layer in a sufficient amount to form a third layer; and allowing the third layer to dry.

Optionally, the process includes a curing step wherein either the first, second, or third layer is allowed to cure after drying, at about room temperature and for a minimum time of about 24 hours. Optionally, the process includes coating the support member with a releasing agent such as polyolefin, polysiloxane, polyfluoroolefin, or a mixture thereof in a sufficient amount to facilitate the release of the correction medium and dye migration barrier from the support member. The process may include a step wherein the correction tape is slitted to a width of about 4.2 mm.

The drying step within the process can be performed in a drying tunnel having at least one IR lamp, convection oven, hot air blower, or a combination thereof.

The organic polymer of the process can be at least one acrylate, methacrylate, styrene, styrene acrylic, styrene butadiene, vinyl acetate homopolymer, a low volatile organic compound, vinyl acetate, vinyl acetate ethylene copolymer, cellulose, or copolymers thereof, preferably at least one of ethylene, vinyl acetate, ethylene vinyl acetate, or copolymers thereof. The releasing agent can be a polyolefin, polysiloxane, polyfluoroolefin, or a mixture thereof.

DETAILED DESCRIPTION OF THE INVENTION

Figure 1:
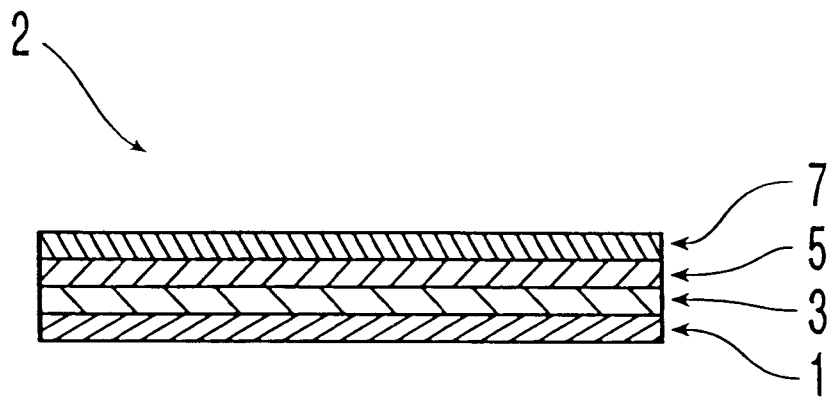
FIG. 1 illustrates one embodiment of the invention wherein a correction tape (2) has a support layer (1), a correction medium layer (3), a dye migration layer (5), and a pressure sensitive adhesive layer (7).

The present invention resolves the problem of bleed-through of dyes through correction tape by incorporating a dye migration barrier, that works as a physical barrier within the correction tape. The dye migration barrier maintains correction medium cohesiveness by reducing tape brittleness by providing an organic polymeric layer that aids to support the correction medium. Additionally, the present invention provides a process for the manufacture of a correction tape with a dye migration barrier.

One embodiment of the invention provides a multiple layered correction tape that increases bleed-through resistance. The invention comprises a support member or backing, a pressure sensitive adhesive (PSA) layer, an correction medium, and a dye migration barrier. The latter has a dual effect; it decreases ink bleed-through and improves film integrity. The dye migration barriers preferably has good bleed resistance when used to cover ink marks. As used herein, the term "ink" or "inks" means an ink which is either water based or solvent based and which is deposited from writing instruments or printing devices or other means. The invention further comprises a support member or backing, optionally coated with a releasing agent and a pressure sensitive adhesive layer.

Suitable support members can be coiled into rolls and used in correction tape dispensers. Suitable correction tape dispensers include those disclosed in European Publication No. EP 727378 A1. Preferred materials for the support member include paper, plastic films, such as polyester, polycarbonate, polyacrylic, polyolefin, polystyrene, etc., and metal foils such as aluminum, zinc, brass, etc. More preferred support members include controlled release siloxane double coated glassine paper such as Item #17513 (50 lb. white coated two sided moderate release) manufactured by Siltech.

Preferably, the support member is coated with a releasing agent. The releasing agent can be a polyolefin, polysiloxane, polyfluoroolefin, a silicone based material, or mixtures thereof. More preferably, the releasing agent is a high molecular weight polyolefin, i.e., a polyolefin with a $M_n$ of at least 20,000, a polysiloxane, a polytetrafluoroolefin, or a mixture thereof. The releasing agent should be present in sufficient amounts to lightly coat the support member and aid the release of the correction medium and dye migration barrier from the support member onto the surface to be corrected. The releasing agent can form a layer of a thickness between about 0.1 microns to about 25 microns. Preferably, the releasing agent layer should be between about 0.5 microns to about 15 microns, more preferably between about 5 microns to about 10 microns.

The term "dye migration barrier" means a physical layer which, when present, prevents or decreases the amount of ink migrating from one surface of the layer of the correction medium onto the opposite surface of the layer. The dye migration barrier is preferably an organic polymer.

As used in the present invention, "organic polymer" means a chemical polymer comprising monomers containing mostly carbon and hydrogen, and if desired oxygen, nitrogen, sulfur, halides, or mixtures thereof. The organic polymer may comprise one or more type of monomers, which can be either saturated or unsaturated. Such organic polymers typically include acrylate, methacrylate, styrene, styrene acrylic, styrene butadiene, vinyl acetate homopolymer, low volatile organic compound (VOC) vinyl acetate, vinyl acetate ethylene copolymers, cellulose and mixtures thereof.

Preferably the organic polymers include acrylonitrile/butadiene/styrene resin, alginic acid sodium salt, butyl methacrylate/isobutyl methacrylate copolymer, cellulose acetate, cellulose acetate butyrate, cellulose propionate, cellulose triacetate, ethyl cellulose, ethylene/acrylic acid copolymer, ethylene/ethyl acrylate copolymer, ethylene/propylene copolymer, ethylene/vinyl acetate copolymer, hydroxybutyl methyl cellulose, hydroxypropyl cellulose, hydroxypropyl methyl cellulose, methyl cellulose, methyl vinyl ether/maleic acid copolymer, methyl vinyl ether/maleic anhydride, nylon, phenoxy resin, polyacetal, polyacrylamide, poly(acrylic acid), polyamide resin, 1,2-polybutadiene, poly(1-butene), poly(n-butyl methacrylate), polycaprolactone, polycarbonate resin, poly(diallyl isophthalate), poly(diallyl phthalate), poly(2,6-dimethyl-p-phenylene oxide), poly(4,4-dipropoxy-2,2-diphenyl propane fumarate), poly(ethyl methacrylate), polyethylene, polyethylene chlorinated, polyethylene chlorosulfonated, poly(ethylene oxide), poly(ethylene terephthalate), poly(2-hydroxyethyl methacrylate), poly(isobutyl methacrylate), polyisoprene, poly(methyl methacrylate), poly(4-methyl-1-pentene), poly(methylstyrene), poly((p-phenylene ethersulphone), poly(phenylene sulfide), polypropylene, polystyrene, polysulfone resin, poly(tetrafluoroethylene), poly(2,4,6-tribromostyrene), poly(vinyl acetate), poly(vinyl alcohol), poly(vinyl butyral), poly(vinyl chloride), poly(vinyl formal), poly(vinyl pyrrolidone), poly(vinyl stearate), poly(vinylidene fluoride), styrene/acrylonitrile copolymer, styrene/allyl alcohol copolymer, styrene/butadiene copolymer, styrene/butyl methacrylate copolymer, styrene/ethylene/butylene copolymer, styrene/isoprene copolymer, styrene/maleic anhydride copolymer, vinyl alcohol/vinyl butyral copolymer, vinyl chloride/vinyl acetate copolymer, vinyl chloride/vinyl acetate/hydroxypropyl acrylate, vinyl chloride/vinyl acetate/vinyl alcohol, vinylidene chloride/acrylonitrile copolymer, vinylidene chloride/vinyl chloride copolymer, N-vinyl pyrrolidone/vinyl acetate copolymer, zein, poly(ethyl acrylate), poly(isopropyl acrylate), poly(n-butyl acrylate), poly(isobutyl acrylate), poly(hexyl acrylate), poly(decyl acrylate), poly(lauryl acrylate), poly(hexyl methacrylate), poly(cyclohexyl methacrylate), poly(lauryl methacrylate), poly(p-t-butylstyrene), polystyrene sulfonate, poly(vinylbenzyl chloride), poly(vinyl toluene), and mixtures thereof. More preferably, the organic polymer includes polymers and copolymers of ethylene, vinyl acetate, ethylene vinyl acetate. Organic polymers are available commercially such as ELVACE 733, ELVACE 735, ELVACE 40722, and ELVACE 97955 manufactured by Reichhold Chemical Co., 2400 Ellis Road, Durham, N.C. 27703-5543.

The dye migration barrier should be present in an amount sufficient to create a physical barrier. The dye migration barrier is preferably positioned between the pressure sensitive adhesive layer and correction medium. The dye migration barrier should be between about 1 micron to about 100 microns thick, preferably between about 3 microns to about 45 microns, and more preferably between about 8 microns to about 10 microns thick.

The correction medium includes compounds having adequate masking property to cover ink marks. The correction medium may optionally include compounds that carry opacifying pigment onto the support member or backing, as well as onto the paper or other substrate that contains the markings to be masked. Any material commonly known in the art is suitable as a correction medium or opacifying pigment. The correction medium may be white, off-white, or any other color suitable to match the surface upon which the correction tape is applied.

The pressure sensitive adhesive includes compounds capable of adhering the correction medium to the paper or other substrate. Suitable pressure sensitive adhesives include National Starch & Chemical (NACOR 4554, 8685, 9926), H. B. Fuller (FULATEX PN-3181-K, PN-3819-G), BASF (ACRONAL V275, A220, 3432), Franklin International (COVINAX 210-00, 225-00, 222-00).

Another aspect of the invention includes a process for the manufacture of a correction tape having a dye migration barrier. The process of forming a correction tape comprises the step coating the support member with an correction medium followed by a first curing period. Thereafter, coating the tape with the correction medium with an organic polymer to form a dye migration barrier, followed by a second curing period. Subsequently, applying a coating of pressure sensitive adhesive to the tape with the dye migrating barrier to form a correction tape. Optionally, the process may contain a step wherein the support member is coated with a releasing agent prior to applying to the opacifying layer.

The step of applying a correction material to the support member to form a correction medium comprises coating the support member with the correction material using methods commonly known in the art, such as by gravure coating or by the Mayer rod technique. Typically the coating process comprises the steps of rolling the support member into the unwind end of a coating machine, moving the support member at a desired rate, and depositing the white opaque correction material into the coating head area at a rate of between about 1 gallon per hour to about 40 gallons per hour, preferably at a rate of between about 15 gallons per hour to about 25 gallons per hour. Once the desired amount and continuity of coating film is achieved, the coating process further comprises the steps of increasing the rate of speed of the support member to a nominal coating speed; and subsequently, drying and curing the tape. The white opacifying material can be applied at a viscosity of between about 15 cps to about 200 cps, preferably between about 25 cps to about 40 cps and at a pH of between about 7.5 to about 9.5, preferably at a pH of between about 8 to about 9. The wet coating thickness is typically between about 40 and about 60 microns, which is reduced to a typical thickness of between about 20 microns to about 30 microns after the curing process, preferably the thickness is between about 24 microns to about 28 microns, more preferably between about 26 to about 28 microns.

The drying step can be carried out by conventional means in the art, such as a drying tunnel. The drying tunnel may be heated using lamps, convection heat, hot air, or a combination thereof, preferably hot air. Typically a drying tunnel is heated by one or more IR lamps, convection heating elements, blowing hot air, or a combination thereof. The temperature of the drying tunnel ranges between about 40° C. to about 110° C. Preferably, the drying tunnel temperature ranges between about 40° C. to about 50° C. when using IR lamps, and between about 40° C. to about 110° C. when using convection heating elements. During the curing step the roll is hung horizontally for at least 24 hours.

Prior to coating the support member with a correction medium, the support member may optionally be coated with a releasing agent. Preferably, the coating should be at least one silicone releasing agent in sufficient amount to aid the release of the correction tape from the support member during normal use of the correction tape.

The application of the dye migration barrier material to coat the correction medium comprises applying an organic polymer in a sufficient amount to prevent the migration of dye or ink across the dye migrating barrier. The step of applying an organic polymer to the correction medium to form a dye migration barrier typically comprises applying a coating of organic polymer to the correction medium using techniques commonly known in the art, such as gravure roll or the Mayer rod technique, followed by a curing period. The steps comprise placing the tape with the correction medium from the previous step into the unwind end of a coating machine. Layering the organic polymer using roll speeds and drying settings of the previous step, followed by a second curing period. The rate of deposition of the organic polymer should be between about 1 meter/min to about 1000 meters/min, preferably between about 10 meters/min to about 200 meters/min, and more preferably between about 20 meters/min to about 50 meters/min. The organic polymer should have a viscosity between about 10 cps to about 5000 cps, preferably between about 50 cps and about 500 cps, more preferably between about 50 cps and about 100 cps. The dye migrating barrier typically has a wet thickness of between about 9 microns to about 25 microns, preferably between about 10 microns to about 15 microns. After the curing process, a typical dry dye migration barrier thickness is between about 2 microns to about 10 microns, preferably between about 3 microns to about 5 microns. During the curing step the roll is hung horizontally for at least 24 hours.

Applying the pressure sensitive adhesive to the dye migrating barrier layer can be carried out using methods commonly known in the art, such as by gravure coating or by the Mayer rod technique. A typical step comprises depositing a pressure sensitive adhesive onto the dye migrating barrier using the techniques described above, followed by drying and a curing period of at least about 24 hours. The pressure sensitive adhesive is typically coated at a viscosity of between about 10 cps to about 60 cps, preferably at a viscosity of about 30 cps, and at a pH of between about 3 to about 5, preferably at a pH of about 4.5. Thereafter, the roll may optionally be slitted to a desired width using techniques commonly known in the art. Preferably, the tape width is between about 3 mm to about 10 mm, more preferably the tape width is about 4.2 mm.

Figure 2:
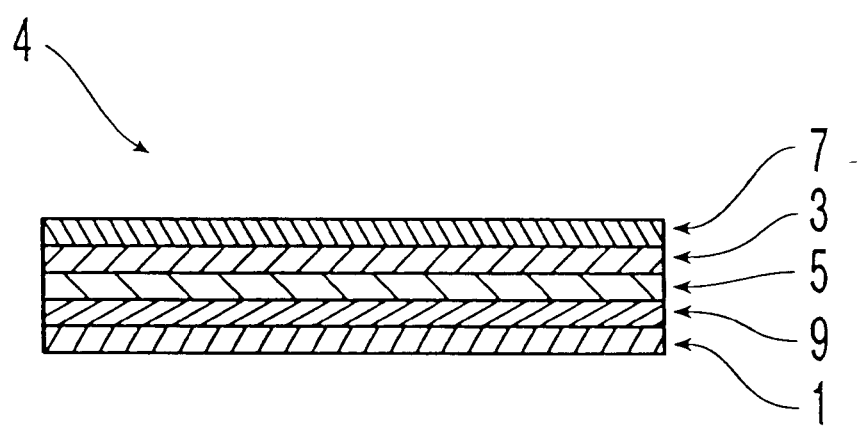
FIG. 2 illustrates one embodiment of the invention wherein a correction tape (4) has a support layer (1), a release layer (9), a dye migration layer (5), a correction medium layer (3), and pressure sensitive adhesive layer (7).

The following description of the figures is meant only as an illustration of embodiments of the invention and is not meant to be a limitation. FIG. 1 illustrates one embodiment of the invention wherein the correction tape (2) has at least one support layer (1), correction medium layer (3), dye migration layer (5), and pressure sensitive adhesive layer (7). FIG. 2 illustrates another embodiment of the invention wherein a correction tape (4) has at least one support layer (1), the optional release layer (9), dye migration layer (5), correction medium layer (3), and pressure sensitive adhesive layer (7).

EXAMPLES

Certain embodiments and features of the invention are now illustrated, but not limited, by the following working examples.

Example 1

A correction tape having a dye migration barrier was manufactured by placing a roll of paper support member into the unwind end of a coating machine. Using a gravure coating technique, the paper was moved at a rate of about 10 m/min; concurrently, a white opaque correction medium was pumped in the coating machine at a rate of between about 15 gallons/min to about 25 gallons/min. Afterwards, the speed was increased to 20 m/min while the engraved gravure roll rotated in the opposite direction of the base of the paper at a speed of about 4.8 m/min. When the engraved gravure roll was covered with white opaque correction medium, a nip roll was lowered down until the distance between the gravure roll and the nip was about 0.2 mm. The liquid white opaque correction medium was applied at a viscosity of between about 25 cps to about 40 cps and at a pH of between about 8 to about 9. Thereafter, the roll was passed through a drying tunnel consisting of three conventionally heated ovens at temperatures of 45° C., 65° C., and 100° C., respectively. The rolled was hung horizontally for a minimum of 24 hours prior to applying the dye migration barrier.

The roll from the previous step was inserted into the unwind end of the coating machine, and the tape was coated with an organic polymer using the settings set forth in the previous step. The wet coating thickness was between about 10 microns to about 15 microns, resulting in a dry dye migration barrier layer of between about 3 microns to about 5 microns. Afterwards, the roll was hung horizontally for a minimum of 24 hours at 25° C.

The roll from the previous step was inserted into the unwind end of coating machine, and the tape was coated with a PSA, applied at the same speed and oven settings as previously described. The PSA was coated at a viscosity of about 20 cps with a pH of about 4.5. Afterwards, the roll was hung horizontally for a minimum of 24 hours prior to slitting to width.

Using the procedure described above, four correction tapes in accordance to the present invention were fabricated. Tape #1 contained ELVACE 733 as the organic polymer, Tape #2 contained ELVACE 735 as the organic polymer, Tape #3 contained ELVACE 739, and Tape #4 contained ELVACE 97955 as the organic polymer.

These samples were evaluated to determine bleed-through resistance. Bleed-through resistance was determined using the following methodology. A test sheet, preferably long grain white 8.5 in×11 in, 75 g/m, was marked with horizontal lines approximately 1 inch long with each of four to seven test inks (BIC Round Stick Black, BIC Round Stick Blue, BIC Round Stick Red (old and new), Cross Red Medium 8515, Rose Art Black, Rose Art Blue, Rose Art Red). One set of lines was made with the four to seven ink pens for each sample to be evaluated. Each of the correction tape samples tested was applied over the ink pen markings on the test sheet by the "nose" or tip of a correction tape applicator. The test sheet was kept in an environment of about 23° C. and about 30% relative humidity for 24 hours. A correction tape sample with minimal ink bleed-through after 24 hours was judged to have improved ink bleed-through qualities.

The correction tapes of the present invention were applied onto various markings on white bond paper and their masking ability was compared. The results were obtained by matching the resulting bleed-through color with the Pantone® Color Formula Guide and reporting the color number which most resembled the bleed-through color. Results are as follows:

TABLE I

| Tape Sample | Test Ink | | | | | | |
|---|---|---|---|---|---|---|---|
| | BIC Black | BIC Old Red | BIC New Red | Cross Red | Rose Art (Black) | Rose Art (Blue) | Rose Art (Red) |
| TIPP EX | 428c | 494c | 495c | 495c | 428c | 278c | 495c |
| TE/Lab* | 428c | 495c | 496c | 496c | <427c | <227c | 496c |
| Tombow | N/O | <503C | N/O | 503c | N/O | N/O | 503c |
| Tape #1 | N/O | 495c | <503c | 502c | N/O | N/O | 502c |
| Tape #2 | N/O | 502c | <503c | 502c | N/O | N/O | 502c |
| Tape #3 | N/O | N/O | N/O | N/O | N/O | N/O | <503c |
| Tape #4 | N/O | N/O | N/O | N/O | N/O | N/O | N/O |

*TE/Lab is a correction tape made in a laboratory following the description for the manufacture of the commercially available TIPP EX correction tape.
N/O = color not observable;
<= lighter than.

Example 2

Using the procedure described in Example 1, seven additional correction tapes were made. Tape #5 contained WORLECRYL 7712E as the organic polymer, Tape #6 contained WORLECRYL 7712E as the organic polymer in a 1:1 mixture with water, Tape #7 contained WORLECRYL 7712W (25% solids) as the organic polymer, Tape #8 contained WORLECRYL 7712W as the organic polymer in a 1:1 mixture with water, Tape #9 contained WORLECRYL 7712 IPA as the organic polymer, Tape #10 contained WORLECRYL 7712 IPA as the organic polymer in a 1:1 mixture with water, and Tape #11 contained AQUAREZ 7G as the organic polymer.

These samples of correction tapes, as described above, were applied onto various markings on white bond paper and their masking ability was compared. Results are as follows:

TABLE II

| | Test Ink | | | |
|---|---|---|---|---|
| Tape Sample | BIC Black | BIC Old Red | BIC New Red | Rose Art (Red) |
| TIFF EX | 428c | 494c | 495c | 495c |
| TE/Lab* | 428c | 495c | 496c | 496c |
| Tombow | N/O | <503c | N/O | 503c |

TABLE II-continued

| | Test Ink | | | |
|---|---|---|---|---|
| Tape Sample | BIC Black | BIC Old Red | BIC New Red | Rose Art (Red) |
| Tape #5 | N/O | N/O | N/O | <503c |
| Tape #6 | N/O | <503c | N/O | <503c |
| Tape #7 | N/O | <503c | N/O | N/O |
| Tape #8 | N/O | 502c | 502c | 502c |
| Tape #9 | N/O | <503c | N/O | <503c |
| Tape #10 | N/O | 503c | <503c | <503c |
| Tape #11 | N/O | 503c | <503c | <503c |

*TE/Lab is a correction tape made in a laboratory following the description for the manufacture of the commercially available TIPP EX correction tape.

Example 3

Using the procedure described in Example 1, four additional correction tapes were made. Tape #12 contained ABCO E700 as the organic polymer, Tape #13 contained ABCO NH-44 as the organic polymer, Tape #14 contained a 1:1 POLYSAT HCRE-ELVACE 735 mixture as the organic polymer, and Tape #15 contained a 1:1 POLYSAT HCRE-ELVACE 739 mixture as the organic polymer.

The correction tapes of the present invention, as described above, were applied onto various markings on white bond paper and their masking ability was compared. Results are as follows:

TABLE III

| | Test Ink | | | |
|---|---|---|---|---|
| Tape Sample | BIC Black | BIC Old Red | BIC New Red | Rose Art Red |
| TIPP EX | 428c | 494c | 495c | 495c |
| TE/Lab* | 428c | 495c | 496c | 496c |
| Tombow | N/O | <503c | N/O | 503c |
| Tape #12 | N/O | 501c | 502c | 501c |
| Tape #13 | 427c | 501c | 501c | 501c |
| Tape #14 | N/O | 501c | 501c | 502c |
| Tape #15 | <427c | 501c | 502c | 502c |

*TE/Lab is a correction tape made in a laboratory following the description for the manufacture of the commercially available TIPP EX correction tape.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed:

1. A correction tape comprising:
   a first layer which is a support member with sufficient rigidity to hold at least a second, third, and fourth layer;
   the second layer comprising a correction medium layer;
   the third layer comprising a dye migration barrier; and
   the fourth layer comprising a pressure sensitive adhesive layer present in sufficient amount to form a layer of a thickness to adhere the second and third layer to a substrate,
   wherein the second and third layers are interposed between the first and fourth layers.

2. The correction tape according to claim 1, wherein the support member is paper, thermoplastic film, or metallic foil.

3. The correction tape according to claim 1, wherein the support member is a coated glassine paper.

4. The correction tape according to claim 1, further comprising a support member which is coated with a releasing agent.

5. The correction tape according to claim 4, wherein the releasing agent is a polyolefin, polysiloxane, polyfluoroolefin, or a mixture thereof.

6. The correction tape according to claim 1, wherein the dye migration barrier comprises at least one organic polymer.

7. The correction tape according to claim 6, wherein the organic polymer comprises at least one acrylate, methacrylate, styrene, styrene acrylic, styrene butadiene, vinyl acetate homopolymer, vinyl acetate, vinyl acetate ethylene, or cellulose.

8. The correction tape according to claim 6, wherein the organic polymer comprises at least one ethylene, vinyl acetate, or ethylene vinyl acetate.

9. The correction tape according to claim 1, wherein the dye migration barrier is between about 1 micron to about 100 microns in thickness.

10. The correction tape according to claim 1, wherein the dye migration barrier is between about 3 microns to about 5 microns in thickness.

11. The correction tape according to claim 1, wherein the pressure sensitive adhesive comprises at least one organic polymer made from monomers of acrylic, or methacrylic.

12. The correction tape according to claim 1, wherein the dye migration barrier retains correction medium integrity.

13. The correction tape according to claim 4, wherein the releasing agent is present in an amount sufficient to form a layer of a thickness of about 0.1 microns to about 25 microns.

14. The correction tape according to claim 4, wherein the releasing agent is present in an amount sufficient to form a layer of a thickness of about 5 microns to about 10 microns.

15. The correction tape according to claim 1, wherein the dye migration barrier is layered to a thickness of about 3 microns to about 45 microns.

16. A correction tape comprising:
   a first layer which is a support member with sufficient rigidity to hold at least a second, third, and forth layer;
   the second layer disposed upon the first layer is an organic polymer layered to a thickness sufficient to mask printed or ink matter on a substrate to form a correction medium layer;
   the third layer disposed upon the second layer is a dye migration barrier layered to a thickness sufficient to prevent ink from traversing from the substrate and through the second layer; and
   the fourth layer disposed upon the third layer and which is a pressure sensitive adhesive present in sufficient amount to form a layer of a thickness sufficient to adhere the second and third layer to a substrate.

* * * * *